(12) United States Patent
Busley (10) Patent No.: US 8,011,739 B2
(45) Date of Patent: Sep. 6, 2011

(54) REPLACEABLE WEAR PAD

(75) Inventor: Peter Busley, Linz/Rhein (DE)

(73) Assignee: Wirtgen GmbH (DE)

( * ) Notice: Subject to any disclaimer, the term of this patent is extended or adjusted under 35 U.S.C. 154(b) by 157 days.

(21) Appl. No.: 12/500,936

(22) Filed: Jul. 10, 2009

(65) Prior Publication Data

US 2009/0278402 A1    Nov. 12, 2009

Related U.S. Application Data

(63) Continuation-in-part of application No. 11/898,249, filed on Sep. 11, 2007, now Pat. No. 7,731,306.

(60) Provisional application No. 61/223,824, filed on Jul. 8, 2009.

(30) Foreign Application Priority Data

Sep. 13, 2006    (DE) .......................... 10 2006 043 763

(51) Int. Cl.
*B62D 55/26* (2006.01)
(52) U.S. Cl. .......................................... 305/46; 305/189
(58) Field of Classification Search .................. 305/46, 305/51, 53, 159, 160, 161, 185, 187, 189, 305/191, 192, 198, 200, 201; 411/429
See application file for complete search history.

(56) References Cited

U.S. PATENT DOCUMENTS

| | | | |
|---|---|---|---|
| 638,326 A | 12/1899 | Farr | |
| 3,058,783 A * | 10/1962 | Wadsworth et al. | 305/51 |
| 5,388,900 A | 2/1995 | Suzuki | |
| 5,857,818 A * | 1/1999 | Bias, Sr. | 411/431 |
| 5,913,579 A | 6/1999 | Kumano et al. | |
| 5,951,125 A * | 9/1999 | Jager et al. | 305/180 |
| 6,213,573 B1 | 4/2001 | Nakayama | |
| 2008/0061626 A1 | 3/2008 | Busley | |

FOREIGN PATENT DOCUMENTS

| | | |
|---|---|---|
| EP | 0994013 A1 | 4/2000 |
| JP | 05278646 A | 10/1993 |
| JP | 08127370 A | 5/1996 |
| JP | 08332979 A * | 12/1996 |

(Continued)

OTHER PUBLICATIONS

Exhibit A: Tufpads.com website printout (2 pages) (undated but admitted to be prior art).

(Continued)

*Primary Examiner* — Kip T Kotter
(74) *Attorney, Agent, or Firm* — Waddey & Patterson, P.C.; Lucian Wayne Beavers (57) ABSTRACT

A replaceable wear pad apparatus for a crawler track of a construction machine includes an elongated reinforcing element having first and second sides. The reinforcing element includes first and second holes disposed therethrough and includes first and second polygonal cross section sockets defined therein on the first side of the reinforcing element co-axial with the first and second holes, respectively, each socket including a socket floor and multiple sides. First and second polygonal cross section nuts are received in the first and second sockets, each nut having a threaded bore co-axial with one of the holes. A wear pad is molded from a wear pad material, the reinforcing element and the nuts being embedded in the molded wear pad material so that the wear pad material holds the nuts in place within the sockets.

30 Claims, 7 Drawing Sheets

FOREIGN PATENT DOCUMENTS

| | | | |
|---|---|---|---|
| JP | 09301233 A | | 11/1997 |
| JP | 2000053039 A | * | 2/2000 |
| JP | 2000159163 A | | 11/2000 |

OTHER PUBLICATIONS

Exhibit B: Bridgestone MT Pad Brochure (6 pages) (undated but admitted to be prior art).

Exhibit C: Trackpads.com website printout (2 pages) (undated but admitted to be prior art).

Exhibit D: Photos of prior art reinforcing element in cross-section of wear pad (3 pages) (undated but admitted to be prior art).

Exhibit E: BLS Poly Bolt-On Track Pads brochure (2 pages) (undated but admitted to be prior art).

Exhibit F: Tufpads Truck Pads brochure (2 pages) (undated but admitted to be prior art).

Exhibit G: Artliner.co website printout (5 pages) (undated but admitted to be prior art).

Exhibit H: Drawing and photos of Wirtgen wear pad using blind rivets per embodiment of Fig. 3 of US 2008/0061626A1, (8 pages) (undated but admitted to have been on sale in the United States more than one year prior to Jul. 10, 2009).

Exhibit I: Wirtgen Group—Parts and More Catalogue excerpts (3 pages) (2007).

Exhibit A: European Search Report dated Jan. 22, 2010, Application No. EP 09165762.7, 2 pages.

* cited by examiner

REPLACEABLE WEAR PAD

This application is a continuation-in-part of U.S. patent application Ser. No. 11/898,249 filed Sep. 11, 2007, which claims foreign priority based on DE 10 2006 043 763.2 filed Sep. 13, 2006. This application also claims priority to U.S. Provisional Patent Application Ser. No. 61/223,824 filed Jul. 8, 2009.

BACKGROUND OF THE INVENTION

The present invention relates generally to a replaceable wear pad apparatus for a crawler track of a construction machine.

SUMMARY OF THE INVENTION

In an embodiment of the invention a replaceable wear pad apparatus for a crawler track of a construction machine includes an elongated reinforcing element having first and second sides, the reinforcing element including first and second holes disposed therethrough and including first and second polygonal cross section sockets defined therein on the first side of the reinforcing element co-axial with the first and second holes, respectively, each socket including a socket floor and multiple sides. First and second polygonal cross section nuts are received in the first and second sockets, each nut having a threaded bore co-axial with one of the holes. A wear pad is molded from a wear pad material. The reinforcing element and the nuts are embedded in the molded wear pad material so that the wear pad material holds the nuts in place within the socket.

In another embodiment of the invention a replaceable wear pad apparatus for a crawler track of a construction machine including a plurality of base plates, includes at least one reinforcing element having upper and lower sides, and having a peripheral edge. The reinforcing element includes at least two spaced holes defined therethrough from the lower side to the upper side. A wear pad is molded from a wear pad material. The peripheral edge of the reinforcing element is completely embedded in the molded wear pad material. The wear pad includes an upper tread surface and a bottom surface. The wear pad includes at least two blind cavities defined therein co-axial with and above the holes of the reinforcing element. The blind cavities are closed so that they do not extend to the upper tread surface. The apparatus further includes at least two fastening devices one of which is received in each of the cavities, and at least two bearing collars formed integrally with the reinforcing element and extending downward from the reinforcing element and terminating essentially flush with the bottom side of the wear pad for engaging the base plate of the crawler track. A lower end of each bearing collar is free of any wear pad material. Each of the bearing collars surrounds one of the holes of the reinforcing element.

In another embodiment a replaceable wear pad apparatus for a crawler track of a construction machine includes a reinforcing element including an upper side, a lower side, first and second holes extending through the reinforcing element, first and second multi-sided recesses defined in the upper side above the first and second holes respectively, each multi-sided recess having a floor and multiple walls. First and second multi-sided nuts are shaped complementary to and are closely received in the multi-sided recesses. Each of the nuts includes a threaded bore co-axial with and extending above a respective one of the holes. A wear pad is molded from a wear pad material. At least a part of the upper side and at least a part of the lower side of the reinforcing element are embedded in the wear pad material. The wear pad includes an upper tread surface extending entirely over the first and second nuts so that the first and second nuts are not accessible from the tread surface.

In another embodiment of the invention a replaceable wear pad apparatus for a crawler track of a construction machine includes a wear pad molded from a wear pad material. The wear pad includes an upper tread surface and a bottom surface. The wear pad has a length and a width. The wear pad includes first and second downward projections extending parallel to the length of the wear pad. Each of the downward projections includes first and second intermediate widthwise recesses. First and second reinforcing elements are embedded in the first and second projections, respectively. Each reinforcing element includes first and second lengthwise outer portions, each outer portion including a hole therethrough and a hexagonal socket located above the hole, each socket including a socket floor. Each reinforcing element further includes first and second intermediate portions located between the outer portions, and a central portion located between the intermediate portions. The first and second intermediate portions are located above the first and second intermediate widthwise recesses, respectively, and the intermediate portions project to a higher level than the outer portions and the central portion. A plurality of hexagonal nuts are provided, one of the nuts received in each of the sockets and embedded in the wear pad material. Each nut has a threaded bore communicated with its associated hole.

Numerous objects, features and advantages of the present invention will be readily apparent to those skilled in the art upon a reading of the following disclosure when taken in conjunction with the accompanying drawings.

DETAILED DESCRIPTION OF THE INVENTION

Figure 1:
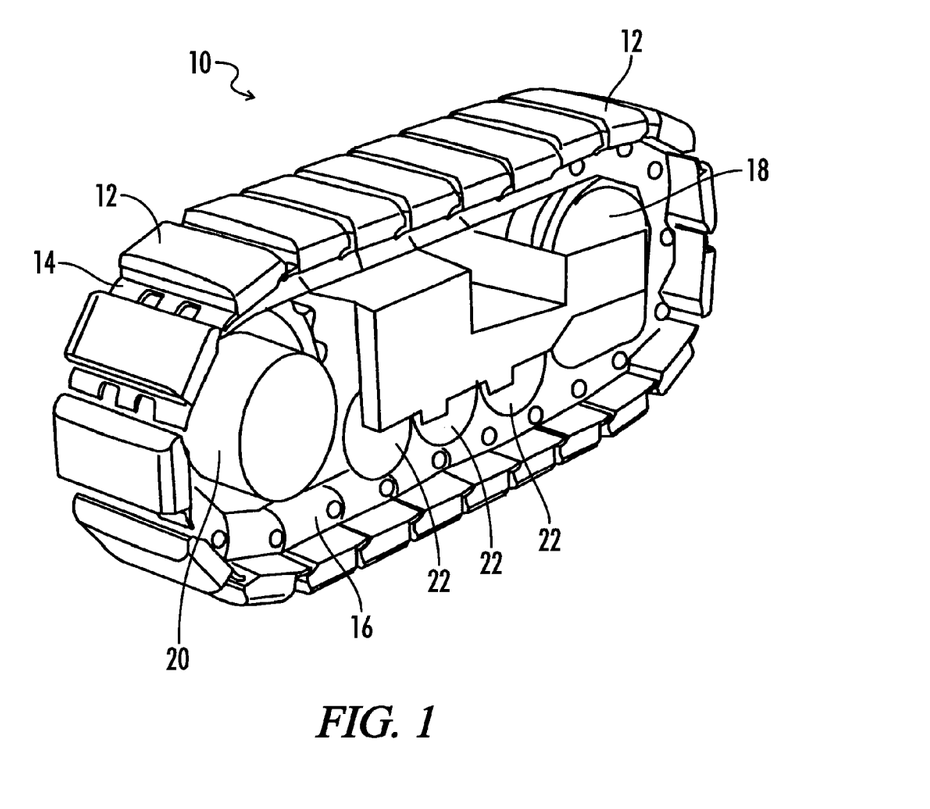
FIG. 1 is a perspective view of a crawler track of a construction machine.

FIG. 1 illustrates a crawler track 10 for a construction machine that runs on replaceable wear pad apparatus 12. Such crawler tracks are utilized on construction machines such as road construction machines, milling machines, and the like. The wear pad apparatus 12 is fastened to base plates 14 in a detachable manner, with the base plates 14 themselves being fastened to chain links 16 of the infinitely rotating crawler track 10. The crawler track 10 with its chain links 16 rotates around two deflection rollers 18 and 20, one of which is driven. Several support rollers 22 are arranged in the lower return side of the crawler track 10, which support the machine weight and run on the chain links 16.

Figure 2:
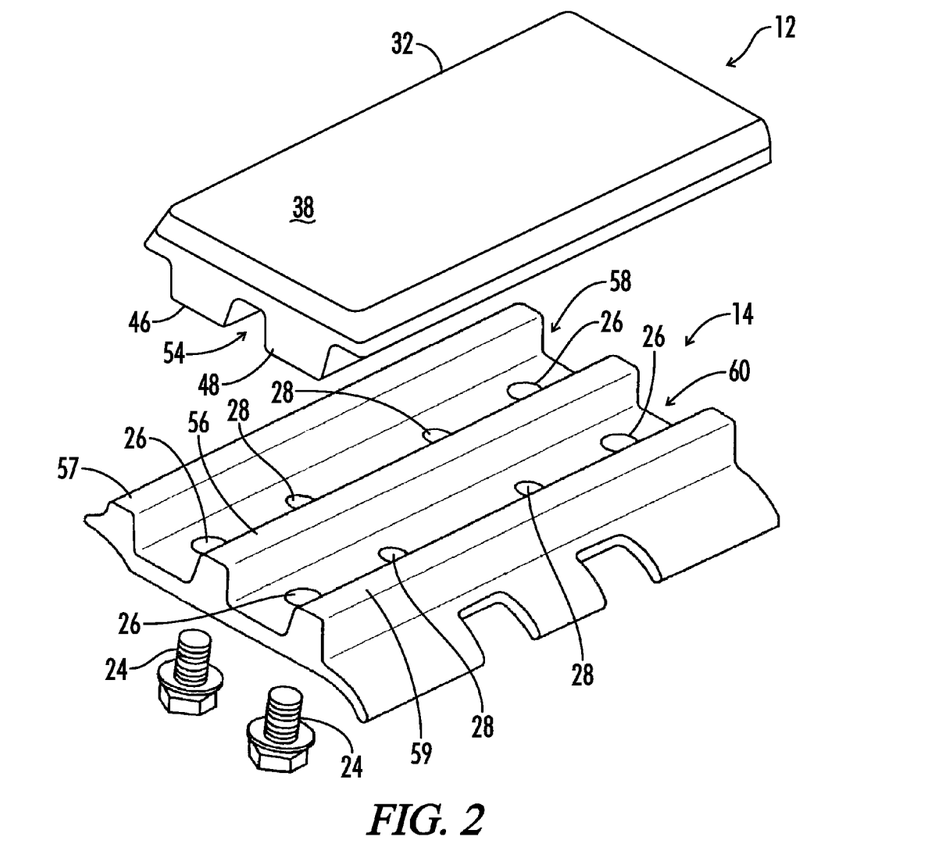
FIG. 2 is a perspective exploded view of a wear pad and base plate of the crawler track.

FIG. 2 shows a perspective view of the wear pad apparatus 12 with the sub-adjacent base plate 14 and two of the total number of four retaining screws 24 for fastening the replaceable wear pad apparatus 12 on the base plate 14.

The wear pad apparatus 12 may be made from an elastomeric material such as for example polyurethane, which is through colored with a light luminescent color, preferably Signal Yellow.

Figure 3:
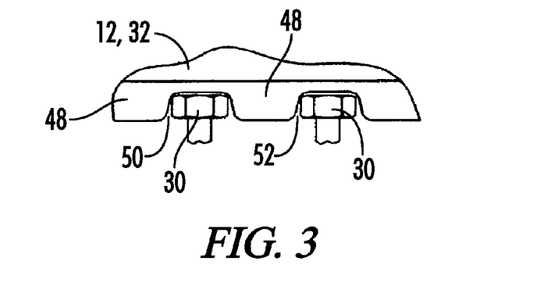
FIG. 3 is a partial view of the recesses in the projections of the wear pad showing the location of the fasteners which connect the base plate to the crawler track.

The base plate 14 includes four holes 26 through which the retaining screws 24 pass to engage threaded nuts in the wear pad apparatus 12 as is further described below. The base plate 14 further includes four holes 28 through which four retaining screws 30 (see FIG. 3) are received to connect the base plate 14 to the chain links 16.

The wear pad apparatus 12 includes a wear pad 32 molded from a wear pad material. The wear pad apparatus 12 further includes first and second elongated reinforcing elements 34 and 36 which are seen in widthwise cross section in FIGS. 4 and 7 and one of which is seen in lengthwise cross section in FIG. 6.

The wear pad 32 includes an upper tread surface 38, a bottom surface 40, a length 42, a width 44, and first and second downward projections 46 and 48 extending parallel to the length 42 of the wear pad. Each of the downward projections 46 and 48 includes at least two intermediate recesses such as 50 and 52 for receiving the aforementioned fasteners 30 which connect the base plate 14 to the chain link 16. The recesses 50 and 52 can be described as widthwise recesses and as interrupting the projections 46 or 48. The intermediate recesses 50 and 52 provide that the fastening devices 30 are covered by the wear pad apparatus 12 in mounted condition and will not become clogged or damaged by road material.

As is further described below, the reinforcing elements 34 and 36 are fixedly embedded in the projections 46 and 48, respectively.

Figure 4:
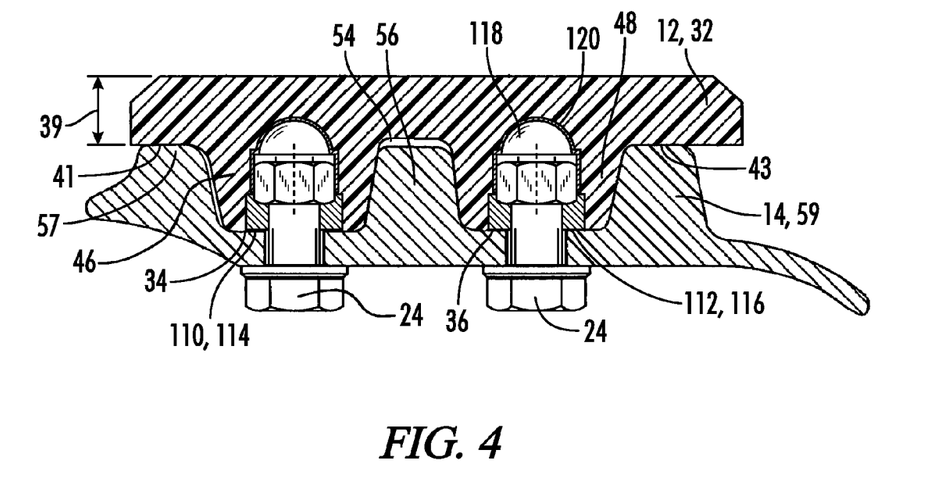
FIG. 4 is a cross section of an assembly of the wear pad with the base plate.
Figure 5:
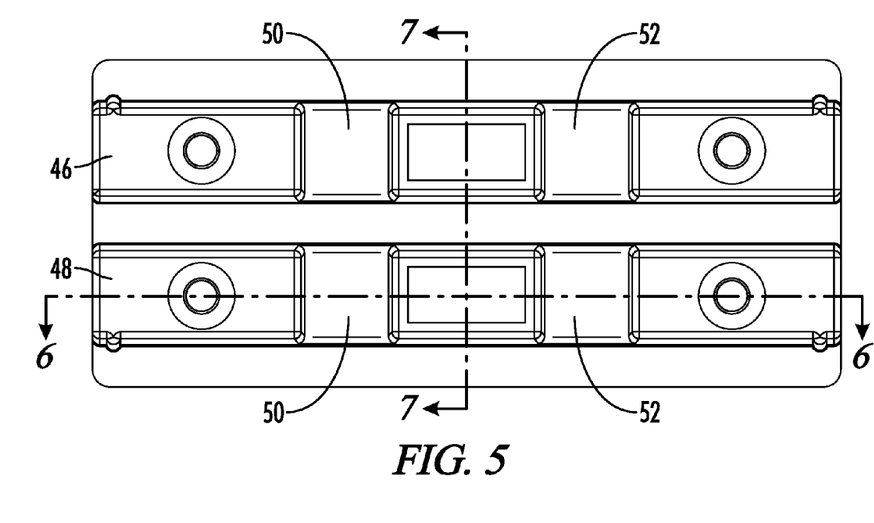
FIG. 5 is a bottom plan view of the wear pad.

As best seen in FIG. 4, the projection of the downward projections 46 and 48 from the bottom of the wear pad leaves a space 54 therebetween. The space 54 between the projections 46 and 48 cooperates with a central stud 56 of the base plate 14 in such a manner that the central stud 56 forms a seat for the space 54 between the projections 46 and 48, and the central stud 56 of the base plate 14 is capable of centering the wear pad apparatus 12 essentially without play on the crawler track 10. A narrow fit may be chosen between the central stud 56 and the space 54 so as to ensure that the wear pad apparatus 12 sits on the base plate 14 essentially without play.

The projections 46 and 48 lie in channels 58 and 60 on the base plate 14 and can rest in the channels 58 and 60. The outer faces of the projections 46 and 48 do, however, have sufficient play with the lateral faces of the channels 58 and 60 so that the wear pad apparatus 12 is centered by the center stud 56 of the base plate 14.

Figure 6:
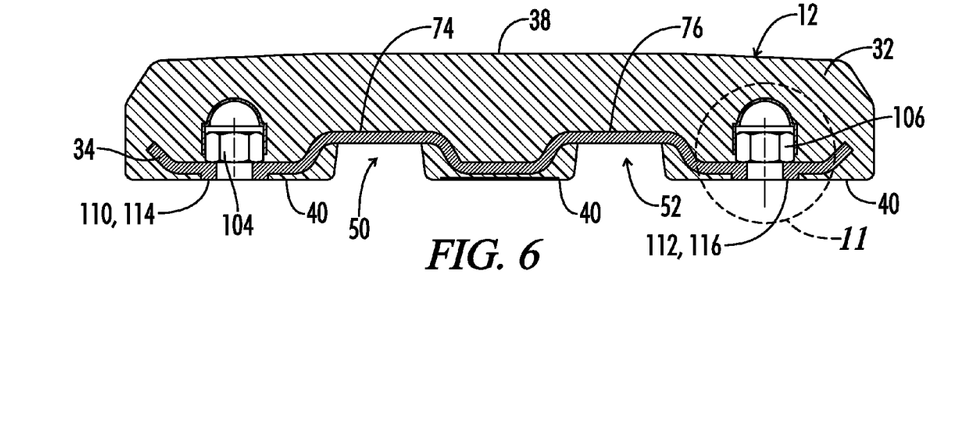
FIG. 6 is a lengthwise cross sectioned view through the hexagonal nuts and the reinforcing element and one of the lengthwise extensions of the wear pad of FIG. 5 taken along line 6-6.
Figure 7:
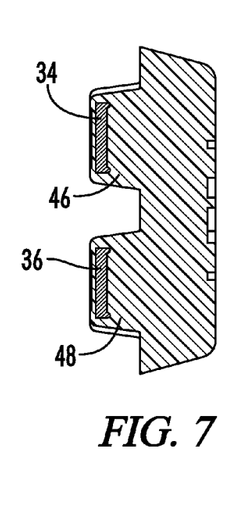
FIG. 7 is an elevation sectioned widthwise view of the wear pad of FIG. 5 taken along line 7-7 of FIG. 5.
Figure 8:
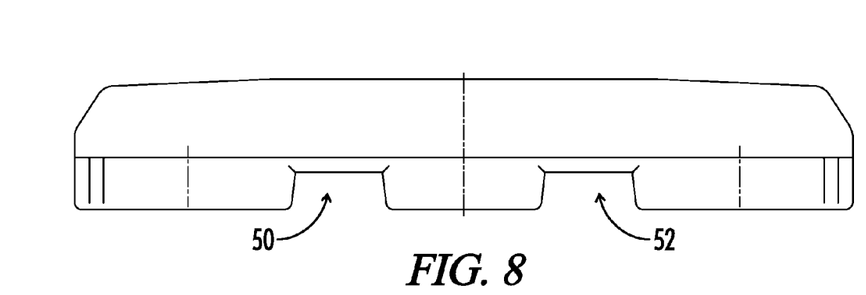
FIG. 8 is a side elevation view of the wear pad of FIG. 5.
Figure 9:
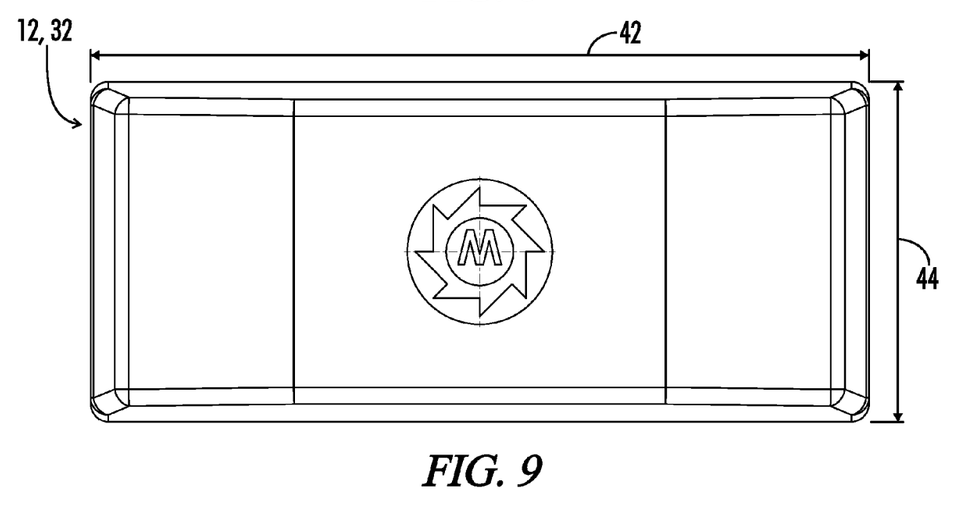
FIG. 9 is a top plan view of the wear pad of FIG. 5.
Figure 10:
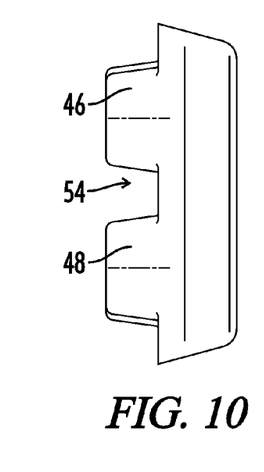
FIG. 10 is an end elevation view of the wear pad of FIG. 5.

The reinforcing elements 34 and 36 are identical to each other. The details of construction of such a reinforcing element are shown in FIGS. 13-20. It is noted that the reinforcing elements 34 and 36 as shown in cross section in FIGS. 6 and 7 are somewhat schematic and are not shown exactly as those elements are shown in FIGS. 13-20. The details set forth in FIGS. 13-20 provide the most accurate illustration of the reinforcing elements 34 and 36. The following detailed description of the reinforcing elements will refer to one of the reinforcing elements 34, with it being understood that the description applies equally well to both.

The reinforcing element 34 is an elongated reinforcing element having a length 62 and a width 64. The length extends parallel to the length 42 of the wear pad apparatus 12, and the elongated reinforcing elements 34 and 36 have their length 62 extending parallel to the lengthwise extensions 46 and 48. As is best seen in FIG. 6, the reinforcing element 34 spans substantially the entire length 42 of the wear pad 32; in one example the length 62 of the reinforcing element 34 is at least 80 percent of the length 42 of the wear pad 32.

The reinforcing element 34 has first and second sides 66 and 68 which may also be referred to as upper and lower sides 66 and 68, respectively. As is best shown in the cross sectional view of FIG. 14, various portions of the upper and lower sides 66 and 68 lie at differing elevations due to the somewhat corrugated shape of the reinforcing elements. Each reinforcing element 34 can be described as being made up of first and second longitudinally or lengthwise outer portions 70 and 72, first and second intermediate portions 74 and 76, and a central portion 78.

The reinforcing element 34 has a peripheral edge 79 when viewed from above or below. The peripheral edge is preferably completely embedded in the wear pad material. The reinforcing element 34 can also be described as having at least a part of its upper side 66 and at least a part of its lower side 68 embedded in the wear pad material.

The intricate shape of the reinforcing element 34 illustrated in FIGS. 13-20 is preferably formed by forging the reinforcing element 34 from a length of steel material. The reinforcing element 34 could also be formed by casting.

The first and second lengthwise outer portions 70 and 72 of reinforcing element 34 have first and second holes 80 and 82, respectively, disposed therethrough from the top surface 66 to the bottom surface 68. The first and second outer portions 70 and 72 further include first and second polygonal, preferably hexagonal, cross section sockets 84 and 86 defined on the first side 66 and generally co-axial with the first and second holes 80 and 82, respectively.

Each of the sockets 84 and 86 includes a socket floor 88 and multiple sides such as 90, 92, 94, 96, 98 and 100. As is best seen in FIG. 13, four of the sides 90, 94, 96 and 100 are formed on laterally inward protrusions which are forged into the top surface of the reinforcing element 34.

The sockets 84 and 86 are illustrated as hexagonal sockets. More generally, the sockets 84 and 86 may be described as polygonal or multi-sided sockets and may be designed for use with polygonal or multi-sided nuts having a number of sides other than six. For example, the sockets and nuts could be four sided.

Figures 13, 14, 16, 17, 18, 19, 20:
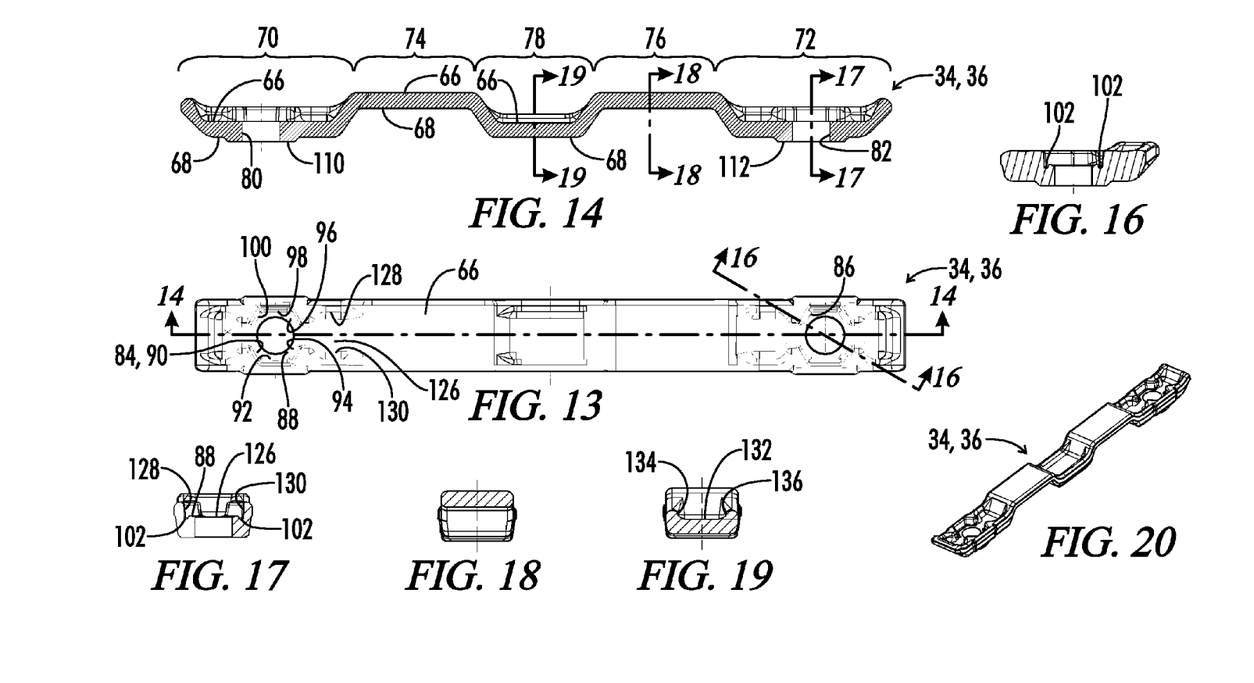
FIG. 13 is a top plan view of one of the reinforcing elements.
FIG. 14 is a lengthwise sectioned view of the reinforcing element of FIG. 13 taken along line 14-14 of FIG. 13.
FIG. 16 is a cross sectional view taken along line 16-16 of FIG. 13 and showing the details in cross section of the hexagonal socket.
FIG. 17 is a cross sectional view taken along line 17-17 of FIG. 14 showing the channel shaped cross section of one of the outer portions of the reinforcing element.
FIG. 18 is a cross sectional view taken along line 18-18 of FIG. 14 showing the cross sectional shape of one of the intermediate portions of the reinforcing element.
FIG. 19 is a cross sectional view taken along line 19-19 of FIG. 14 showing the channel shaped cross section of the center portion of the reinforcing element.
FIG. 20 is a perspective view of the reinforcing element of FIG. 13.
Figure 15:
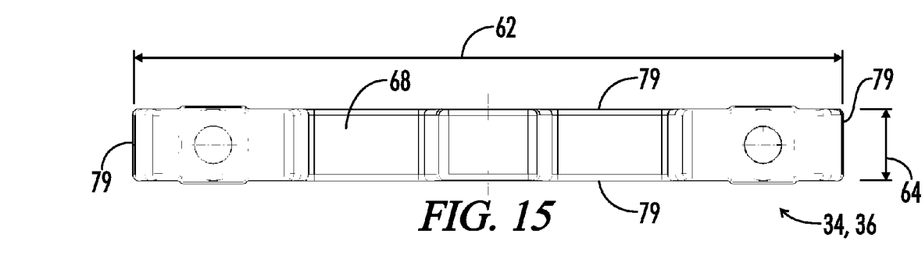
FIG. 15 is a bottom view of the reinforcing element of FIG. 13.

As best seen in FIGS. 16 and 17, adjacent each of the sides 90-100 there is a groove or indentation 102 in the floor 88. The purpose of the groove 102 is to provide a flat floor 88 for supporting of the hexagonal nuts to be received in the sockets, without any upwardly rounded edges.

As best seen in FIG. 6, the sockets 84 and 86 have first and second hexagonal nuts 104 and 106 received therein.

Figure 11:
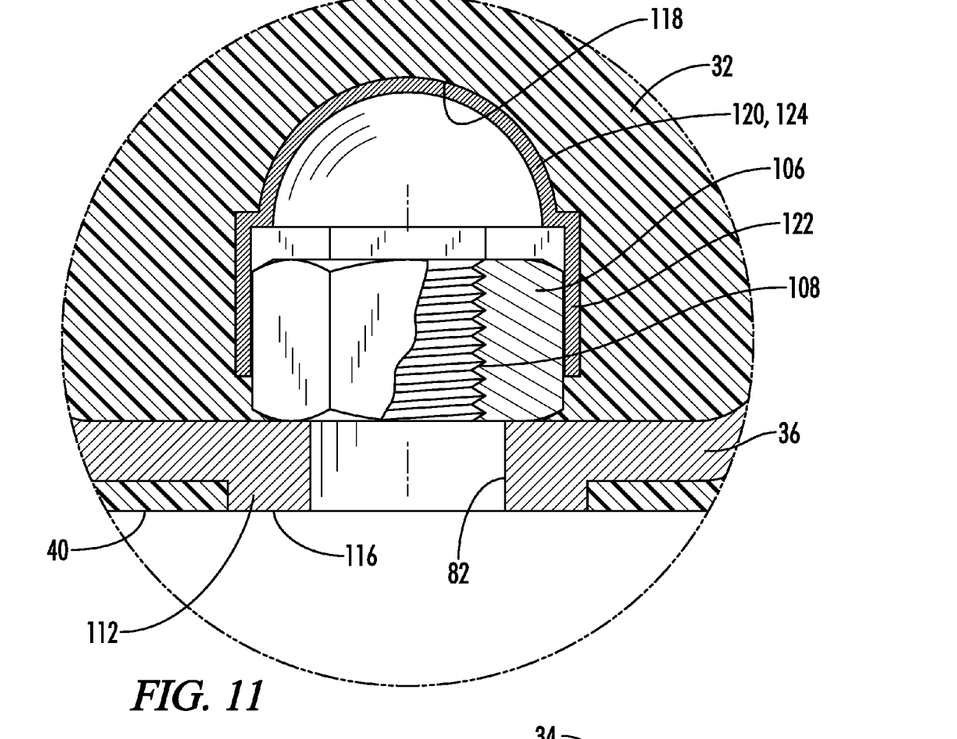
FIG. 11 is an enlarged cross sectional view of the encircled portion of FIG. 6 indicated by the numeral 11.
Figure 12:
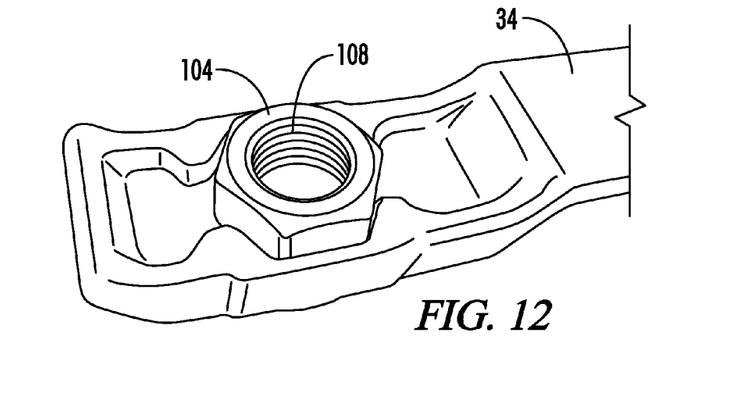
FIG. 12 is an enlarged perspective view of one end of the reinforcing element with a hexagonal nut received in the hexagonal socket thereof.

As best seen in the enlarged view of FIG. 11, each nut has a threaded bore 108 co-axial with a respective one of the holes such as 82.

The nuts 104 and 106 rest upon the floors 88 of the sockets 84 and 86 and are closely received with small tolerance between the six walls 90-100. The walls 90-100 preferably are substantially vertical and engage the six sides of the nuts with close tolerance so that the sockets securely hold the nuts against rotation relative to the reinforcing element when the fastening devices 24 are tightened to attached the wear pad apparatus 12 to the base plate 14.

The reinforcing element 34 further includes first and second integral bearing collars 110 and 112 extending downward from the reinforcing element 34 below the holes 80 and 82 and terminating essentially flush with the bottom side 40 of the wear pad 32. The bearing collars may also be referred to as bearing rings. As best seen in FIG. 6, the bearing collars 110 and 112 have lower ends 114 and 116, respectively, which are free of any wear pad material. These lower ends 114 and 116 of the bearing collars 110 and 112 directly engage the base plate 14 without there being any wear pad material therebetween so that the fasteners 24 may securely attach the wear pad apparatus 12 to the base plate 14. Due to the absence of any wear pad material between the lower ends 114 and 116 and the supporting surface of the base plate 14, the wear pad apparatus 12 is less likely to become loose during operation and thus there is a substantially reduced requirement for inspection and retightening of the fasteners 24 as contrasted to some prior art devices in which wear pad material has been present between the reinforcing elements and the base plate.

As best seen in FIG. 11, the wear pad 32 has defined therein a plurality of blind cavities 118, each of the cavities being co-axial with and above one of the threaded bores 108 of one of the hexagonal nuts such as 106. The cavity 118 is preferably formed by placing a slip-on hollow cap 120 over each of the nuts. The cap 120 includes a hexagonal cross section base part 122 within which its associated nut 106 is at least partially received, and a hollow dome 124 extending upward from the base part 122. The hollow cap 120 may be constructed of plastic, metal or any other suitable material. The cavity 118 provides a space above the threaded bore 108 of nut 106 through which the threaded bolt portion of the fasteners 24 may extend. The upper surface 38 of the wear pad 32 may be described as a continuous upper tread surface 38 which is free of any openings communicated with the cavities 118 or the nuts 104 and 106. The blind cavities may be described as being closed so that they do not extend to the upper tread surface 38. The nuts 104 and 106 may be generally described as fastening devices 104 and 106 received in the cavities 118. The tread surface 38 is a continuous surface extending entirely over the nuts 104 and 106 and free of any openings communicated with the nuts so that the nuts are not accessible from the tread surface 38.

The hexagonal nuts with slip-on hollow caps could also be replaced by acorn nuts having a dome shaped portion integral with the hexagonal nut so as to define the cavity therein extending above the hexagonal portion of the nut.

The upper portion of the wear pad 32 on which the tread surface 38 is defined has a tread thickness 39 defined between tread surface 38 and downward facing surfaces 41 and 43 which face the studs 57 and 59 of baseplate 14. The projections 46 and 48 project downward below the downward facing surfaces 41 and 43. As is best seen in FIG. 4, the blind cavities such as 118 extend upward substantially into this tread thickness 39.

It will be appreciated that as the wear pad 32 is used the tread surface 38 will wear away and the tread thickness 39 will decrease. By using plastic caps 120 projecting into the thickness 39, a wear indicator is provided which will allow the cavity 118 to be breached prior to the time the tread surface 38 wears down to any metal component such as the base plate 14 which could be damaged or which could cause damage to the ground surface on which the track 10 runs.

Also as best seen in FIG. 4, the nuts such as 104 are located entirely in the projections 46 and 48 and do not extend into the tread thickness 39, thus the nuts 104 can never engage and damage the ground surface. With the embodiment shown in FIG. 4, the wear pad 32 could completely wear off down to one of the studs 56, 57 or 59 without metal parts from the screws 24 or nuts 104 getting into contact with the ground. This permits a maximum useful life of the wear pad 32 which would otherwise have to be replaced if any of its metal parts prematurely came into contact with the ground.

As is best shown in FIG. 17, the first and second lengthwise outermost portions 70 and 72 of the elongated reinforcing element 34 are generally channel shaped in cross section transverse to the length 62 of the reinforcing element 34. The channel shaped cross section includes a channel floor 126 and opposed outer longitudinal walls 128 and 130. A portion of each of the channel floors 126 comprises the socket floor 88 of its associated socket such as 84.

Similarly, the central portion 78 is channel shaped in cross section as best shown in FIG. 19, and has a floor 132 and first and second outer longitudinal walls 134 and 136. The intermediate portions 74 and 76 may also be formed with a channel shaped cross-section similar to that shown in FIG. 19.

By forming the first and second outer portions 70 and 72 and the central portion 78 of elongated reinforcing element 34 to have a channel shaped cross section, the structural strength of those portions of the elongated reinforcing element 34 is substantially increased as contrasted to a reinforcing element containing an equal amount of material but having a simple rectangular cross section like that of a flat steel bar.

As best seen in FIGS. 6 and 14, the intermediate portions 74 and 76 of reinforcing element 34 are elevationally offset higher than the first and second outer portions 70 and 72 and the central portion 78. The central portion 78 and the outer portions 70 and 72 each lie at a substantially equal lower elevation and the floor portions thereof may be substantially coplanar.

As can be seen in FIG. 6, the intermediate portions 74 and 76 are located above the intermediate recesses 50 and 52, respectively, defined in the wear pad 32.

The intermediate portions 74 and 76 may be generally described as lying in an upper plane, and the outer portions 70 and 72 and central portion 78 may be generally described as lying in a lower plane at a lower elevation than the higher plane. Alternatively, the intermediate portions 74 and 76 may be described as projecting to a higher level than the outer portions 70 and 72 and the central portion 78.

Method of Manufacturing

The wear pad apparatus 12 is generally manufactured in the following manner:

1. The reinforcing elements 34 and 36 are forged from lengths of steel material.
2. Two of the reinforcing elements are placed in a mold apparatus (not shown) with their first sides 66 facing upward, and four hexagonal nuts such as 104 and 106 are placed in the respective sockets of the reinforcing elements.
3. Four of the hollow caps such as 120 are placed over the four nuts.
4. The mold apparatus is closed and the wear pad material is injected therein to mold the wear pad 32 about the reinforcing elements 34 and 36, and the hexagonal nuts and hollow caps. The reinforcing elements and nuts are embedded in the molded wear pad material as seen in FIGS. 4 and 6 so that the molded wear pad material holds the nuts in place within their respective sockets in the finished article.

During the molding process care is taken that the bottom surface 40 of the wear pad 32 is flush with the lower ends 114 and 116 of the bearing collars 110 and 112 so that the lower ends 114 and 116 are free of any wear pad material. This allows the lower ends 114 and 116 of the bearing collars 110 and 112 to directly bear upon the metal support surfaces of the base plate 14 when the wear pad apparatus 12 is attached thereto by means of the fasteners 24.

Thus it is seen that the present invention readily achieves the ends and advantages mentioned as well as those inherent therein. While certain preferred embodiments of the invention have been illustrated and described for purposes of the present disclosure, numerous changes in the arrangement and construction of the parts thereof may be made by those skilled in the art which changes are encompassed within the scope and spirit of the present invention as defined by the appended claims.

What is claimed is:

1. A replaceable wear pad apparatus for a crawler track of a construction machine, the apparatus comprising:
    an elongated reinforcing element having first and second sides, the reinforcing element including first and second longitudinally spaced holes disposed therethrough and including first and second polygonal cross section longitudinally spaced sockets integrally defined therein on the first side of the reinforcing element co-axial with the first and second holes, respectively, each socket including a socket floor and multiple sides;
    first and second polygonal cross section nuts received in the first and second sockets, each nut having a threaded bore co-axial with one of the holes; and
    a wear pad molded from a wear pad material, the reinforcing element and the nuts being embedded in the molded wear pad material so that the wear pad material holds the nuts in place within the sockets.

2. The apparatus of claim 1, wherein the polygonal sockets comprise hexagonal sockets.

3. The apparatus of claim 1, wherein:
    the reinforcing element further comprises first and second integral bearing collars extending from the second side of the reinforcing element, each one of the bearing collars surrounding one of the holes of the reinforcing element.

4. The apparatus of claim 3, wherein:
    the wear pad includes a continuous upper tread surface free of any openings communicated with the nuts, and a bottom surface essentially flush with lower ends of the bearing collars so that the lower ends of the bearing collars are free of any wear pad material.

5. The apparatus of claim 1, wherein:
    the reinforcing element includes first and second lengthwise outer portions having the first and second sockets defined therein, respectively, the outer portions being channel shaped in cross-section transverse to the length of the reinforcing element, the channel shaped cross-section including a channel floor and opposed outer longitudinal walls.

6. The apparatus of claim 5, wherein a portion of each channel floor comprises the socket floor of the associated socket.

7. The apparatus of claim 5, wherein:
    the reinforcing element includes at least one intermediate portion lying between the first and second outer portions and elevationally offset higher than the first and second outer portions.

8. The apparatus of claim 7, wherein:
    the reinforcing element includes two such intermediate portions separated by a central portion, the central portion including a channel shape cross-section including a central portion floor substantially co-planar with the channel floors of the first and second outer portions of the reinforcing element.

9. The apparatus of claim 1, wherein:
    the reinforcing element is a one-piece element having a length at least 80 percent of a length of the wear pad parallel to the reinforcing element length.

10. A replaceable wear pad apparatus for a crawler track of a construction machine, the crawler track including a plurality of base plates, the apparatus comprising:
    at least one reinforcing element having upper and lower sides, and having a peripheral edge, the reinforcing element including at least two longitudinally spaced holes defined therethrough;
    a wear pad molded from a wear pad material, the peripheral edge of the reinforcing element being completely embedded in the molded wear pad material, the wear pad including an upper tread surface and a bottom surface, the wear pad including at least two longitudinally spaced blind cavities defined therein co-axial with and above the holes of the reinforcing element, the blind cavities being closed so that they do not extend to the upper tread surface; and
    at least two fastening devices one of which is received in each of the cavities; and
    at least two bearing collars formed integrally with the reinforcing element and extending downward from the reinforcing element and terminating essentially flush with the bottom side of the wear pad for engaging one of the base plate plates of the crawler track, a lower end of each bearing collar being free of any wear pad material, each one of the bearing collars surrounding one of the holes of the reinforcing element.

11. The apparatus of claim 10, wherein:
    the reinforcing element includes at least two polygonal cross-section sockets defined in the upper side, each socket surrounding one of the holes of the reinforcing element, each socket including a floor and multiple walls; and
    the fastening devices comprise polygonal cross-section nuts, each one of the nuts being received in a respective one of the polygonal cross-section sockets.

12. The apparatus of claim 11, further comprising:
    at least two hollow caps, each one of the caps being received over a respective one of the nuts and extending upward therefrom, each cap defining a respective one of the blind cavities above its respective hole.

13. The apparatus of claim 12, wherein each of the caps comprises:
a polygonal cross-section base part within which its associated nut is at least partially received; and
a hollow dome extending upward from the base part.

14. The apparatus of claim 12, wherein the caps comprise a plastic material.

15. The apparatus of claim 10, wherein:
the wear pad has a length and a width, and the reinforcing element is a one-piece element spanning substantially the entire length of the wear pad.

16. A replaceable wear pad apparatus for a crawler track of a construction machine, the apparatus comprising:
a reinforcing element including an upper side, a lower side, first and second longitudinally spaced holes extending through the reinforcing element, first and second longitudinally spaced multi-sided recesses integrally defined in the upper side above the first and second holes respectively, each multi-sided recess having a floor and multiple walls;
first and second multi-sided nuts shaped complementary to and closely received in the multi-sided recesses, each of the nuts including a threaded bore co-axial with and extending above a respective one of the holes; and
a wear pad molded from a wear pad material, at least a part of the upper side and at least a part of the lower side of the reinforcing element being embedded in the wear pad material, the wear pad including an upper tread surface extending entirely over the first and second nuts so that the first and second nuts are not accessible from the tread surface.

17. The apparatus of claim 16, wherein:
the wear pad further comprises first and second blind cavities defined in the wear pad above the first and second nuts, respectively, the blind cavities being closed so that they do not extend to the upper tread surface.

18. The apparatus of claim 17, further comprising:
first and second slip-on caps received over the first and second nuts, respectively, and defining the first and second cavities, respectively.

19. The apparatus of claim 16, wherein:
the reinforcing element further includes first and second integral bearing rings extending downward from the lower side and surrounding the first and second holes, respectively, each bearing ring including a lower end terminating flush with a lower wear pad surface so that no wear pad material covers the lower ends of the bearing rings.

20. The apparatus of claim 16, wherein:
the multi-sided recesses are hexagonal recesses; and
the multi-sided nuts are hexagonal nuts.

21. The apparatus of claim 16, wherein:
the reinforcing element has a length at least 80 percent of a length of the wear pad.

22. A replaceable wear pad apparatus for a crawler track of a construction machine, the apparatus comprising:
a wear pad molded from a wear pad material, the wear pad including an upper tread surface and a bottom surface, the wear pad having a length and a width, the wear pad including first and second downward projections extending parallel to the length of the wear pad, each of the downward projections including at least one intermediate recess;
first and second reinforcing elements embedded in the first and second projections, respectively, each reinforcing element including:
first and second lengthwise outer portions each outer portion including a hole therethrough and a hexagonal socket located above the hole, each socket including a socket floor; and
at least one intermediate portion located between the outer portions;
wherein the at least one intermediate portion is located above the at least one intermediate recess and the at least one intermediate portion projects to a higher level than the outer portions; and
a plurality of hexagonal nuts, one of the nuts received in each of the sockets and embedded in the wear pad material, each nut having a threaded bore communicated with its associated hole.

23. The apparatus of claim 22, wherein:
each reinforcing element further comprises first and second integral bearing collars extending downward below each of its sockets, a lower end of each bearing collar being free of any wear pad material.

24. The apparatus of claim 22, wherein:
the wear pad includes a continuous upper tread surface free of any openings communicated with the nuts.

25. The apparatus of claim 22, wherein:
the outer portions of each reinforcing element are channel shaped in cross-section transverse to the length of the reinforcing element, the channel shaped cross-section including a channel floor and opposed outer longitudinal walls.

26. The apparatus of claim 25, wherein:
a portion of the channel floor of each of the outer portions of each of the reinforcing elements comprises the socket floor of the associated socket.

27. The apparatus of claim 22, wherein:
the at least one intermediate recess of the wear pad comprises at least two intermediate recesses;
the at least one intermediate portion of each reinforcing element comprises first and second intermediate portions; and
each reinforcing element further comprises a central portion located between the intermediate portions, the central portion being located at a lower level than the intermediate portions.

28. The apparatus of claim 22, wherein:
each reinforcing element comprises a one-piece element.

29. The apparatus of claim 28, wherein:
each reinforcing element spans at least 80 percent of the length of the wear pad.

30. The apparatus of claim 22, further comprising:
a plurality of hollow plastic caps, each one of the caps being received over a respective one of the nuts and extending upward therefrom, each cap defining a blind cavity in the wear pad above its respective nut; and
wherein the wear pad has a thickness above the projections, and the plastic caps extend into the thickness of the wear pad, with the nuts being located entirely in the projections below the thickness of the wear pad.

* * * * *

UNITED STATES PATENT AND TRADEMARK OFFICE
CERTIFICATE OF CORRECTION

| | |
|---|---|
| PATENT NO. | : 8,011,739 B2 |
| APPLICATION NO. | : 12/500936 |
| DATED | : September 6, 2011 |
| INVENTOR(S) | : Peter Busley |

It is certified that error appears in the above-identified patent and that said Letters Patent is hereby corrected as shown below:

Column 8, line 52, delete "plate" before --plates--.

Signed and Sealed this
Twenty-fifth Day of October, 2011

David J. Kappos
*Director of the United States Patent and Trademark Office*